US011011799B2

(12) United States Patent
Aoyama et al.

(10) Patent No.: US 11,011,799 B2
(45) Date of Patent: May 18, 2021

(54) BATTERY PACK

(75) Inventors: Tsutomu Aoyama, Fukushima (JP);
Hiromasa Iguchi, Tokyo (JP);
Hiroyuki Yamada, Fukushima (JP);
Takanori Takei, Nagano (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 1760 days.

(21) Appl. No.: 11/695,419

(22) Filed: Apr. 2, 2007

(65) Prior Publication Data
US 2007/0231682 A1 Oct. 4, 2007

(30) Foreign Application Priority Data

Apr. 3, 2006 (JP) .............................. JP2006-101517

(51) Int. Cl.
*H01M 50/502* (2021.01)
*H01M 50/183* (2021.01)
*H01M 50/543* (2021.01)
H01M 50/209 (2021.01)

(52) U.S. Cl.
CPC ....... *H01M 50/502* (2021.01); *H01M 50/183* (2021.01); *H01M 50/543* (2021.01); *H01M 50/209* (2021.01)

(58) Field of Classification Search
CPC .......... H01M 2/22; H01M 2/30; H01M 2/021; H01M 2/266; H01M 50/502; H01M 50/183; H01M 50/543; H01M 50/209
USPC .................................................. 429/149–162
See application file for complete search history.

(56) References Cited

U.S. PATENT DOCUMENTS

| 7,597,994 B2 * | 10/2009 | Kozu et al. ................... 429/121 |
| 7,875,383 B2 * | 1/2011 | Hwang ............... H01M 2/0202 429/162 |
| 2003/0027043 A1 * | 2/2003 | Benson et al. ................ 429/178 |
| 2003/0121142 A1 * | 7/2003 | Kikuchi et al. .............. 29/623.4 |
| 2003/0146734 A1 * | 8/2003 | Kozu .................... H01M 2/021 320/107 |
| 2003/0215702 A1 * | 11/2003 | Tanjou .................. H01M 2/204 429/127 |

(Continued)

FOREIGN PATENT DOCUMENTS

| JP | 10-188942 | 7/1998 |
| JP | 2002-260609 | 9/2002 |

(Continued)

OTHER PUBLICATIONS

Machine Translation: JP 2004/055348.*

(Continued)

*Primary Examiner* — Stephen J Yanchuk
(74) *Attorney, Agent, or Firm* — K&L Gates LLP

(57) ABSTRACT

A battery pack is disclosed. The battery pack includes one or more battery assemblies and a circuit board connected to the battery assemblies. The battery assembly includes first and second battery cells having the predetermined surfaces overlaid on each other. The first and second battery cells each have battery elements accommodated in a container thereof, and cathode terminals and anode terminals are provided at a same height as the predetermined surfaces at a same side. The cathode terminal and anode terminal of the first battery cell are adjacent respectively to the cathode terminal and anode terminal of the second battery cell.

10 Claims, 12 Drawing Sheets

(56) References Cited

U.S. PATENT DOCUMENTS

| | | | | |
|---|---|---|---|---|
| 2004/0119442 A1* | 6/2004 | Lee et al. | | 320/112 |
| 2005/0181242 A1* | 8/2005 | Suzuki | | H01M 2/0212 |
| | | | | 429/7 |
| 2006/0166086 A1* | 7/2006 | Kato | | H01M 2/021 |
| | | | | 429/153 |
| 2006/0269831 A1* | 11/2006 | Kim | | 429/62 |

FOREIGN PATENT DOCUMENTS

| | | | |
|---|---|---|---|
| JP | 2003-530658 | | 10/2003 |
| JP | 2004-047167 | | 2/2004 |
| JP | 2004-055348 | | 2/2004 |
| JP | 2004-071178 | | 3/2004 |
| JP | 2004-095357 | | 3/2004 |
| JP | 2004-103258 | | 4/2004 |
| JP | 2004-171893 | | 6/2004 |
| JP | 2004-311402 | | 11/2004 |
| JP | 2004-335229 | | 11/2004 |
| JP | 2005174661 | * | 6/2005 |
| JP | 2005-302698 | | 10/2005 |
| WO | WO03/056643 | * | 7/2003 |

OTHER PUBLICATIONS

Machine Translation: JP 2005/174661.*
Japanese Patent Office, Decision of refusal issued in connection with Japanese Patent Application No. 2006-101517, dated Aug. 7, 2012. (3 pages).
Court Hearing, Complaint Appeal No. 2012-22122 issued in connection with Japanese Patent Application No. 2006-101517, dated Feb. 4, 2013. (4 pages).
Japanese Office Action dated May 1, 2012, for corresponding Japanese Appin. No. 2006-101517.
Japanese Office Action dated Jul. 12, 2013 for corresponding Japanese Appln. No. 2006-101517.
Japanese Office Action dated Feb. 12, 2014 for corresponding Japanese Appln. No. 2012-245659.
Japanese Intellectual Property Office, Office action issued in connection with Japanese Patent Application No. 2012-245659, dated Jun. 10, 2014. (5 pages).

* cited by examiner

BATTERY PACK

CROSS REFERENCES TO RELATED APPLICATIONS

The present application claims priority to Japanese Patent Application JP 2006-101517 filed in the Japanese Patent Office on Apr. 3, 2006, the entire contents of which being incorporated herein by reference.

BACKGROUND

The present application relates to a battery pack configured by combining a plurality of battery cells.

Recently, portable electronic appliances are widely spread including laptop personal computers (PCs), cellphones, and personal digital assistants (PDAs), and lithium ion secondary batteries are widely used as power sources because of their merits such as high voltage, high energy density, and light weight.

In the laptop PCs, for example, cylindrical lithium ion secondary batteries using an electrolytic solution as an electrolyte are often used, but when an electrolytic solution is used, measures against liquid leakage are demanded. As countermeasures for liquid leakage leading to a problem when using an electrolytic solution, a lithium ion polymer secondary battery has been put to practical use by using, for example, a gel polymer electrolyte having a polymer impregnated with a nonaqueous electrolytic solution, or a solid-state polymer electrolyte.

The lithium ion polymer secondary battery includes a cathode, an anode, and a polymer electrolyte. Battery elements having terminals leading out from the cathode and anode are composed as battery cells covered with a container film or the like. The battery pack is configured to be accommodated in a box-shaped plastic molded case including upper and lower cases as well as a circuit board on which battery cells and circuits are mounted.

In the specification, the "battery element" refers to one configured such that a band-like cathode and a band-like anode are laminated by way of a polymer electrolyte and/or separator, and wound in a longitudinal direction while terminals thereof lead out from the cathode and anode. The battery elements are covered with a soft film, being called a battery cell. The battery cell provided with a circuit board on which protective circuits and the like are mounted, and accommodated in a container is called a battery pack.

In an electronic appliance using a battery pack as a power source, a larger capacity is demanded to extend the operation time of the electronic appliance. To increase the capacity of the battery pack, hitherto, a battery pack has been used which is composed of battery assemblies connected in parallel by overlaying a plurality of battery cells of a same shape in one direction, and connecting electrode terminals at upper and lower positions.

A technology concerning a battery assembly composed of a plurality of battery cells is disclosed in Japanese Patent Application Laid-Open No. 2004-47167.

A battery assembly 100 in related art will be briefly explained below. FIG. 1 shows an exemplary configuration of the battery assembly 100. The battery assembly 100 is configured by a plurality of battery cells 102 overlaid such that cathode terminals 111a and anode terminals 111b (or electrode terminals 111 if polarity is not specified) are positioned in a same direction. The electrode terminals 111 of each battery cell 102 are connected to a circuit board 112 by way of a relay tab 113.

The circuit board 112 is provided with various mounted parts, such as a protective circuit including a charge and discharge control field effect transistor (FET) and an integrated circuit (IC) for monitoring a secondary battery and controlling the charge and discharge control FET, and a connector for making connection with external units. The circuit board 112 has contact points to be connected to the electrode terminals 111. The relay tab 113 is composed of a conductive metal plate of aluminum Al, nickel Ni or the like.

FIG. 2 is a side view showing a state in which the battery assembly 100 is connected with the circuit board 112. When connecting the battery assembly 100 and the circuit board 112 with each other, relay tabs 113 are connected to electrode terminals 111 of a plurality of overlaid battery cells 102 by welding, for example. The relay tab 113 connected to the electrode terminal 111 of one battery cell 102 is folded, for example, like a crank, and is connected to the relay tab 113 connected to the electrode terminal 111 of the other battery cell 102. Then, the relay tabs 113 are connected to contact points of the circuit board 112 by welding, for example. In this manner, the electrode terminals of the plurality of battery cells and the circuit board 112 are electrically connected with each other.

In the case of the battery assembly in related art explained so far, the electrode terminals of the battery cells lead out from the bottom side. For this reason, when the plurality of battery cells are overlaid, they are separated by the portion of thickness of the battery cell itself. In the past, to connect the battery cells and the circuit board, electrode terminals have been mutually connected by using conductive relay tabs between the electrode terminals and the circuit board, and then the relay tabs and the circuit board have been connected. In this case, however, an extra space is demanded for connecting the relay tabs, leading to a problem that the space in the battery pack is not used efficiently.

When connecting electrode terminals of a plurality of battery cells mutually, there is a need that one relay tab is folded toward the other relay tab. When the relay tab is folded and used, however, a stress is applied to the folded portion of the relay tab, so that the relay tab may be broken due to vibration or impact etc., and the relay tab and the electrode terminal may be disconnected, leading to a problem that the quality of the battery pack may be lowered.

When fabricating battery cells, a dimension error of about ±1 mm may occur in the position of electrode terminals. For this reason, when connecting electrode terminals of overlaid battery cells by using relay tabs, positioning is difficult, and the working efficiency may be lowered.

SUMMARY

It is desirable to provide a battery pack capable of saving a connection space by arranging battery cells efficiently, and of enhancing the assembling efficiency.

According to an embodiment, there is provided a battery pack including: one or more battery assemblies; and a circuit board connected to the battery assemblies, wherein the battery assembly includes first and second battery cells having the predetermined surfaces overlaid on each other, the first and second battery cells each have battery elements accommodated in a container thereof, cathode terminals and anode terminals of which are provided at a same height as the predetermined surfaces at a same side, and the cathode terminal and anode terminal of the first battery cell are adjacent respectively to the cathode terminal and anode terminal of the second battery cell.

In the embodiment, the cathode terminals and anode terminals of the first and second battery cells are provided at a same height as the predetermined surfaces of the battery cells at a same side, and the predetermined surfaces of the first and second battery cells are overlaid on each other. Consequently, the mutual cathode terminals and mutual anode terminals of the first and second battery cells are adjacent to each other, so that the mutual cathode terminals and mutual anode terminals can be connected directly to each other.

According to an embodiment, the respective electrode terminals of the first and second battery cells are directly connected with the circuit board without using relay tabs. With the constitution, the connection space can be saved to downsize the battery pack, and the working efficiency in fabricating the battery pack can be enhanced.

Further, according to an embodiment, the electrode terminals of the first and second battery cells are directly connected with the circuit board, which provides an advantage that a stress applied to the electrode terminals is eliminated and the quality of the battery pack can be enhanced.

Additional features and advantages are described herein, and will be apparent from, the following Detailed Description and the figures.

DETAILED DESCRIPTION

Figure 1:
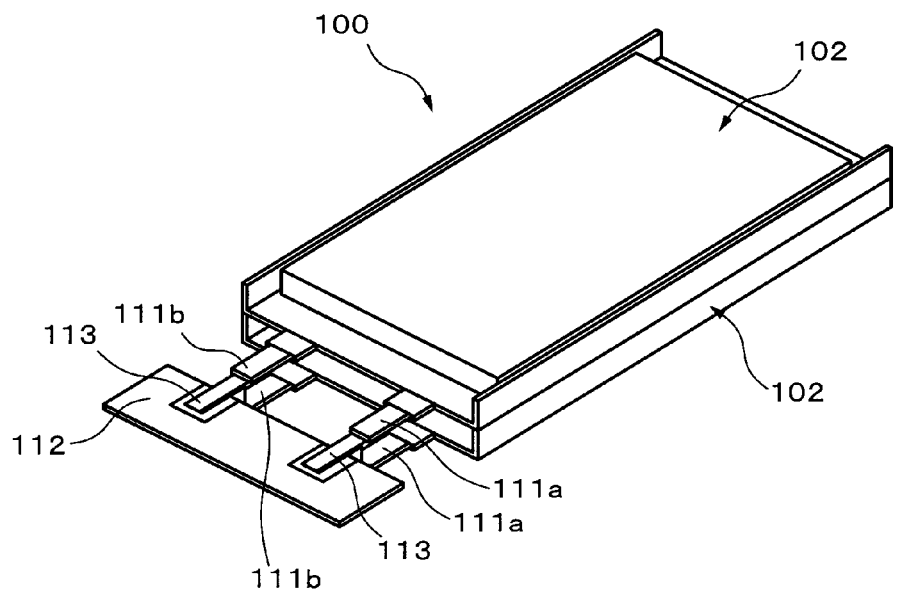
FIG. 1 is a perspective view of an exemplary configuration of a battery assembly in related art.
Figure 2:
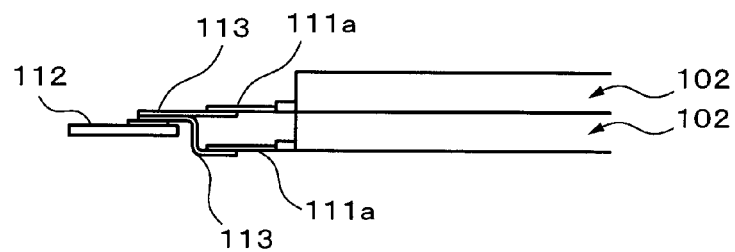
FIG. 2 is a side view of a state in which battery assembly and circuit board in related art are connected with each other.
Figure 3:
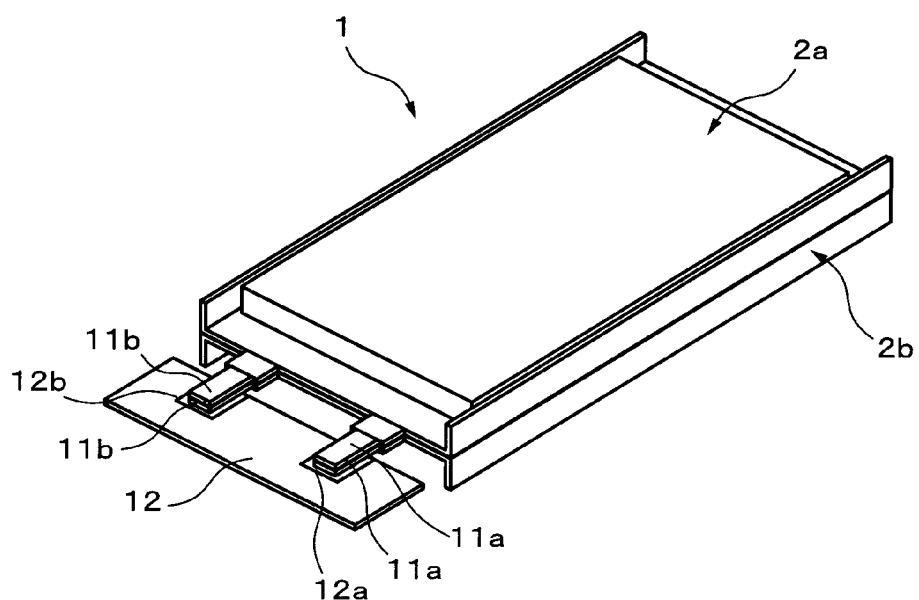
FIG. 3 is a perspective view of an exemplary configuration of a battery assembly applicable to an embodiment.

Referring now to the drawings, an embodiment will be described below. FIG. 3 shows an exemplary configuration of a battery assembly 1 applicable to the embodiment of the invention. The battery assembly 1 is configured such that flat first battery cell 2a and second battery cell 2b are joined to each other at the bottoms thereof and cathode terminals 11a, 11a and anode terminals 11b, 11b (or electrode terminals 11 if polarity is not specified) are adjacently overlaid on each other. The electrode terminals 11 of the battery cells 2a and 2b are connected to a circuit board 12. The second battery cell 2b is similar to the first battery cell 2a except that the positional relation of the cathode terminal 11a and anode terminal 11b is inverted.

The circuit board 12 has contact portions 12a for making connection with the cathode terminals 11a, and contact portions 12b for making connection with the anode terminals 11b, so that the cathode terminals 11a and anode terminals 11b of the battery cells 2a and 2b can be connected by, for example, resistance welding or ultrasonic welding. Various parts are mounted on the circuit board 12, including temperature protective elements such as fuses and thermistors, charge and discharge control FET, protective circuits including ICs for monitoring a secondary battery and controlling the charge and discharge control FET, and connectors for making connection with external units.

Figure 4:
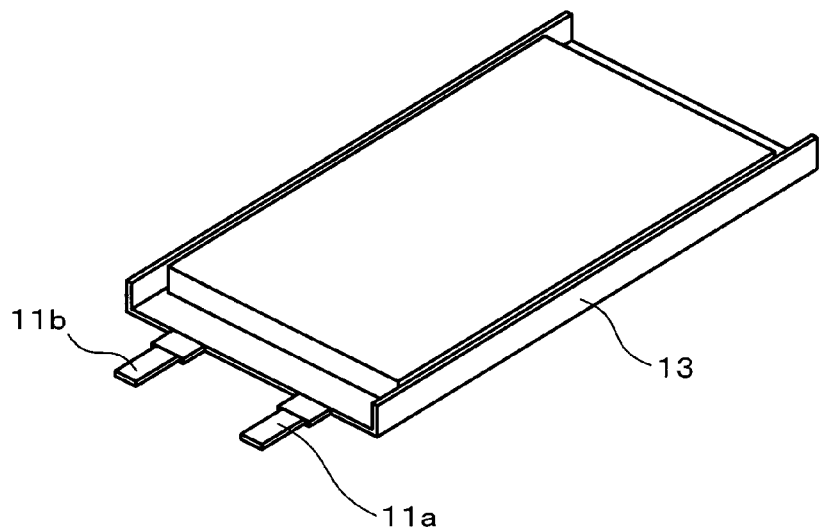
FIG. 4 is a perspective view of an appearance of a first battery cell applicable to an embodiment.

FIG. 4 shows an example of an appearance of the first battery cell 2a applicable to the embodiment. The first battery cell 2a is configured such that a first battery element 3 described below is accommodated in a soft laminate film 13 molded in a predetermined shape. The cathode terminal 11a and anode terminal 11b are connected to the first battery element 3 accommodated in the soft laminate film 13, and are made to lead out from a predetermined side surface of the first battery cell 2a.

The second battery cell 2b, like the first battery cell 2a described above, has a configuration that a second battery element 3 described below is accommodated in a soft laminate film 13 molded in a predetermined shape. The second battery cell 2b is similar to the first battery cell 2a except that the positional relation of the cathode terminal 11a and anode terminal 11b is inverted, and other configurations are same as those of the first battery cell 2a.

Figure 5:
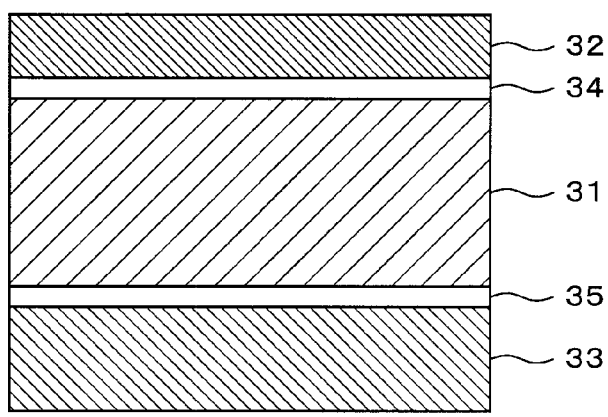
FIG. 5 is a schematic view showing an example of a layer structure of a soft laminate film.

FIG. 5 shows an example of a layer structure of the soft laminate film 13. The soft laminate film 13 is composed of a multilayer film having moisture-proof property and insulation property. The multilayer film has a metal foil, which is denoted by reference numeral 31, enclosed between a container layer 32 and a sealant layer 33.

The metal layer 31 is formed of a soft metal material, and plays the role of enhancing the strength of the container material, and protecting the contents by preventing invasion of moisture, oxygen and light. As the soft metal material, aluminum Al is most preferable from the viewpoint of lightness of weight, elongation, price, and ease of processing, and it is particularly preferred to use aluminum, such as 8021-O or 8079-O with the thickness in a range of about 30 μm to 130 μm. The metal layer 31 and container layer 32, and the metal layer 31 and sealant layer 33 are respectively adhered to each other by way of adhesive layers 34 and 35. The adhesive layer 34 may be omitted as required.

Materials for the container layer 32 include polyolefin resin, polyamide resin, polyimide resin, and polyester from the viewpoint of appearance, toughness, and flexibility. Specific examples thereof include nylon Ny, polyethylene terephthalate PET, polyethylene naphthalate PEN, polybutylene terephthalate PBT, and polybutylene naphthalate PBN, and plural types may be selected from them and used. The thickness of the container layer 32 is about 10 μm to 30 μm.

The sealant layer 33 is a portion to be melted and fused together by heat or ultrasonic wave, and usable examples thereof include polyethylene PE, cast polypropylene CPP, polyethylene terephthalate PET, nylon Ny, low density polyethylene LDPE, high density polyethylene HDPE, and linear low density polyethylene LLDPE, and plural types may be selected from them and used.

A most general composition of a laminate film is container layer/metal foil/sealant layer=Ny/Al/CPP. Not limited to this combination, other general compositions of a laminate film may also be employed. Examples thereof include container layer/metal film/sealant layer=Ny/Al/PE, PET/Al/CPP, PET/Al/PET/CPP, PET/Ny/Al/CPP, PET/Ny/Al/Ny/CPP, PET/Ny/Al/Ny/PE, Ny/PE/Al/LLDPE, PET/PE/Al/PET/LDPE, and PET/Ny/Al/LDPE/CPP. As a metal foil, other metals than Al may be also used.

Figure 6:
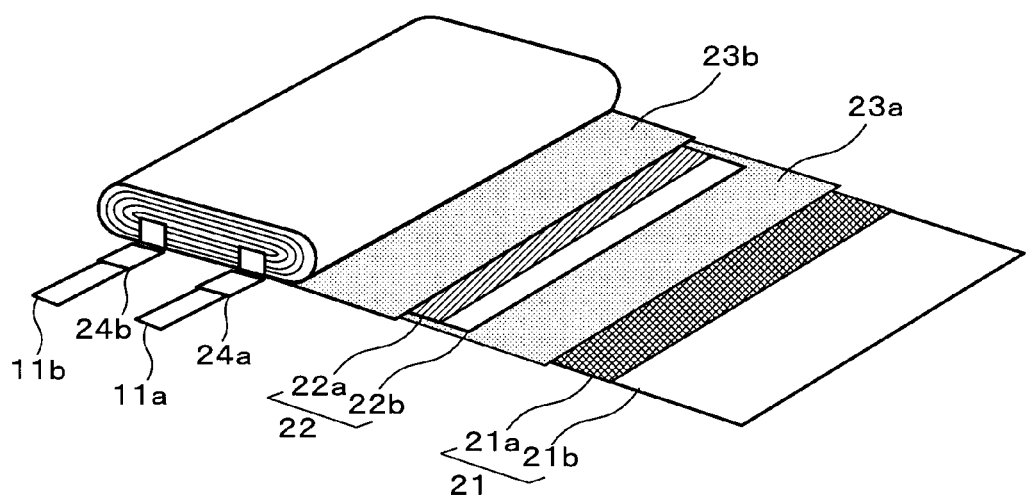
FIG. 6 is a schematic view of an exemplary configuration of a first battery element.

FIG. 6 shows an exemplary configuration of the first battery element 3. In the following explanation, a same reference numeral is given to the first and second battery elements 3, and the first battery element 3 will be explained by way of example. The first battery element 3 is composed by laminating a band-like cathode 21, a separator 23a, a band-like anode 22 arranged oppositely to the cathode 21, and a separator 23b sequentially and winding them in a longitudinal direction, and a gel electrolyte (not shown) is formed on both the sides of the cathode 21 and anode 22. A cathode terminal 11a connected to the cathode 21 and an anode terminal 11b connected to the anode 22 are made to lead out from the first battery element 3. Both the sides of the cathode terminal 11a and anode terminal 11b are covered with resin pieces 24a and 24b for enhancing the adhesion with a laminate film to be containered later.

The second battery element 3 is same as the first battery element 3 except that the positional relation of the cathode terminal 11a and anode terminal 11b is inverted. Thus, illustration is omitted, and same reference numerals are given to common parts and explanations thereof are omitted.

The material for the first battery terminal 3 and second battery terminal 3 will be specifically explained below.

[Cathode]

The cathode 21 has a cathode active material layer 21a containing a cathode active material formed on both sides of a cathode current collector 21b. The cathode current collector 21b is composed of a metal foil such as, for example, aluminum (Al) foil, nickel (Ni) foil, or stainless steel (SUS) foil.

The cathode active material layer 21a is configured to contain, for example, a cathode active material, a conductive agent, and a binder. These materials are uniformly blended to prepare a cathode mix, and the cathode mix is dispersed in a solvent to obtain a slurry. Then, the slurry is uniformly applied on the cathode current collector 21b by a doctor blade method or the like, and dried at high temperature to evaporate off the solvent. It suffices that the cathode active material, conductive agent, binder, and solvent are dispersed uniformly, and the blending ratio is not specified.

As the cathode active material, used is a composite oxide of lithium and transition metal, mainly composed of $Li_xMO_2$ (where M is one or more transition metals, and x varies with the charge or discharge state of the battery, usually about 0.05 or more and 1.10 or less). For example, cobalt Co, nickel Ni, and manganese Mn are used as the transition metal for composing the lithium composite oxide.

Specific examples of the lithium composite oxide include $LiCoO_2$, $LiNiO_2$, $LiMn_2O_4$, and $LiNi_yCo_{1-y}O_2$ (0<y<1). A solid solution having part of transition metal element replaced with another element is also usable. Examples thereof include $LiNi_{0.5}Co_{0.5}O_2$, and $LiNi_{0.8}Co_{0.2}O_2$. These lithium composite oxides are capable of generating a high voltage, and are excellent in energy density. Other examples of the cathode active material include metal sulfide or oxide not containing lithium, such as $TiS_2$, $MoS_2$, $NbSe_2$ and $V_2O_5$.

Examples of the conductive agent includes carbon materials such as carbon black and graphite. Examples of the binder include polyvinylidene fluoride, polytetrafluoroethylene, and polyvinylidene fluoride. As the solvent, N-methyl pyrrolidone is used, for example.

The cathode 21 has a cathode terminal 11a connected to one end of the cathode current collector 21b by spot welding or ultrasonic welding. The cathode terminal 11a is desirably metal foil or mesh, but it is not limited to metal as far as it is stable electrochemically and chemically, and conductive. The material for the cathode terminal 11a is, for example, Al.

[Anode]

The anode 22 has an anode active material layer 22a containing an anode active material formed on both sides of an anode current collector 22b. The anode current collector 22b is composed of a metal foil such as, for example, copper (Cu) foil, nickel (Ni) foil, or stainless steel foil.

The anode active material layer 22a is configured to contain, for example, an anode active material, and if necessary, a conductive agent and a binder. These materials are uniformly blended to prepare an anode mix, and the anode mix is dispersed in a solvent to obtain a slurry. The slurry is uniformly applied on the anode current collector 22b by a doctor blade method or the like, and dried at high temperature to evaporate off the solvent, so that the anode active material layer 22a is formed. It suffices that the anode active material, conductive agent, binder, and solvent are dispersed uniformly, and the blending ratio is not specified.

The anode active material is lithium metal, lithium alloy, a carbon material capable of doping or dedoping lithium, or a composite material of metal system material and carbon system material. Specific examples of the carbon material capable of doping or dedoping lithium include graphite, non-easy-graphitizable carbon, and easy-graphitizable carbon. More specific examples include pyrolyzed carbons, cokes (pitch coke, needle coke, petroleum coke), graphites, glassy carbons, organic polymer compound sinter (phenol resin, furan resin or others sintered at proper temperature until carbonized), carbon fiber, active carbon, and other carbon materials. Examples of the material capable of doping or dedoping lithium include polymers such as polyacetylene and polypyrrole, and oxide such as $SnO_2$.

Various metals may be used as the material capable of alloying lithium, and particularly preferred examples are tin Sn, cobalt Co, indium In, aluminum Al, silicon Si, and their alloys. When using metal lithium, it is not necessarily that a powder is formed in a coat film with a binder, and for example, a rolled Li metal plate may be used.

Examples of the binder include polyvinylidene fluoride and styrene butadiene rubber. Examples of the solvent include N-methylpyrrolidone and methyl ethyl ketone.

The anode 22, like the cathode 21, has an anode terminal 11b connected to one end of the anode current collector 22b by spot welding or ultrasonic welding. The anode terminal 11b is preferably metal foil or mesh, but it is not limited to metal as far as it is stable electrochemically and chemically, and conductive. The material for the anode terminal 11b is, for example, copper Cu and nickel Ni.

[Electrolyte]

The electrolyte is a gel material containing an electrolytic solution, and a polymer compound serving as a carrier for carrying the electrolytic solution. The gel electrolyte is preferred because a high ion conductivity can be obtained and liquid leakage of the battery can be prevented.

As the electrolytic solution, used is a nonaqueous electrolytic solution obtained by dissolving an electrolyte salt in a nonaqueous solvent. The nonaqueous solvent preferably contains, for example, at least one of ethylene carbonate and propylene carbonate because the cycle characteristic can be enhanced. In particular, when ethylene carbonate and propylene carbonate are mixed and contained, the cycle characteristic can be further improved, which is preferable.

The nonaqueous solvent preferably contains at least one of chain ester carbonates including diethyl carbonate, dimethyl carbonate, ethyl methyl carbonate, and methyl propyl carbonate. This is because the cycle characteristic can be further enhanced.

The nonaqueous solvent further preferably contains at least one of 2,4-difluoroanisole and vinylene carbonate. This is because the 2,4-difluoroanisole can improve the discharge capacity and the vinylene carbonate can enhance the cycle characteristic. In particular, when both are mixed and contained, both discharge capacity and cycle characteristic can be enhanced, which is preferable.

Moreover, the nonaqueous solvent may contain one type or two or more types of butylene carbonate, γ-butyrolactone, γ-valerolactone, a compound having part or whole of a hydroxyl group of these compounds replaced with a fluorine group, 1,2-dimethoxy ethane, tetrahydrofuran, 2-methyl tetrahydrofuran, 1,3-dioxolane, 4-methyl-1,3-dioxolane, methyl acetate, methyl propionate, acetonitrile, glutaronitrile, adiponitrile, methoxy acetonitrile, 3-methoxy propylonitrile, N,N-dimethyl formamide, N-methyl pyrrolidinone, N-methyl oxazolidinone, N,N-dimethyl imidazolidinone, nitromethane, nitroethane, sulforane, dimethyl sulfoxide, and trimethyl phosphate.

Depending on the electrode to be combined, by using a compound having part or whole of hydrogen atoms of substances included in the group of these nonaqueous solvents replaced with fluorine atoms, reversibility of electrode reaction may be enhanced. Therefore, such substances may be used appropriately.

Preferable examples of the lithium salt, or the electrolyte salt, include $LiPF_6$, $LiBF_4$, $LiAsF_6$, $LiClO_4$, $LiB(C_6H_5)_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, $LiBF_2(ox)$, LiBOB or LiBr, and one type or two or more types of them may be mixed and used. In particular, $LiPF_6$ is preferred because a high ion conductivity can be obtained and cycle characteristic can be enhanced.

Examples of the polymer compound include polyacrylonitrile, polyvinylidene fluoride, copolymer of polyvinylidene fluoride and polyhexaafluoro propylene, polytetrafluoro ethylene, polyhexafluoro propylene, polyethylene oxide, polypropylene oxide, polyphosphagen, polysiloxane, polyvinyl acetate, polyvinyl alcohol, polymethyl methacrylate, polyacrylic acid, polymethacrylic acid, styrene-butadiene rubber, nitrile-butadiene rubber, polystyrene, and polycarbonate. Considering electrochemical stability, particularly preferable are polyacrylonitrile, polyvinylidene fluoride, polyhexafluoro propylene, and polyethylene oxide.

[Separator]

The separator is composed of a porous membrane made of a polyolefin material such as polypropylene PP or polyethylene PE, or a porous membrane made of an inorganic material, such as a ceramic unwoven cloth, and may have a structure of two or more porous membranes laminated. In particular, porous films of polyethylene and polypropylene are most effective.

In general, the thickness of the separator is preferably 5 to 50 μm, and more preferably 7 to 30 μm. If the separator is too thick, the amount of the active material filled is lowered to decrease the battery capacity and the ion conductivity declines to lower the current characteristic. If too thin, the mechanical strength of the membrane is lowered.

A method of manufacturing the battery assembly 1 applicable to the embodiment of the invention will be described below.

[Method of Manufacturing Battery Elements]

A method of manufacturing first battery element 3 and second battery element 3 will be explained. A cathode 21 and an anode 22 are respectively coated with a precursor solution containing a solvent, an electrolyte salt, a polymer compound, and a mixed solvent, and the mixed solvent is evaporated to form a gel electrolyte. Subsequently, a cathode terminal 11a is attached to an end of a cathode current collector 21b by welding, while an anode terminal 11b is attached to an end of an anode current collector 22b by welding. Then, the cathode 21 and anode 22 having the gel electrolyte formed thereon are laminated through a separator 23a to form a laminated body, and the laminated body is wound in its longitudinal direction.

When the cathode terminal 11a and anode terminal 11b are provided at the winding start side of the cathode current collector 21b and anode current collector 22b, the cathode terminal 11a and anode terminal 11b are made to lead out from near the center of the wound battery elements 3.

In this case, the cathode terminal 11a and anode terminal 11b of the first battery element 3 are bent to one principal plane side along the end face, and then bent to be substantially in the same plane as the one principal plane to be formed like a crank. The cathode terminal 11a and anode terminal 11b of the second battery element 3 are bent to the other principal plane side opposite to one principal plane along the end face, and then bent to be substantially in the same plane as the other principal plane.

Thus, by bending the electrode terminals 11 in a crank shape and varying the bending direction, the first battery element 3 and second battery element 3 mutually inverted in the positional relation of the cathode terminal 11a and anode terminal 11b can be formed.

The positions at which the cathode terminal 1a and anode terminal 11b are mounted are not limited to this example, and may be mounted, for example, at the winding end side of the cathode current collector 21b and anode current collector 22b. When the cathode terminal 11a and anode terminal 11b are mounted at the winding end side of the cathode current collector 21b and anode current collector 22b, the cathode terminal 11a and anode terminal 11b are made to lead out from the same plane as the principal plane of the end face.

When mounting the cathode terminal 11a and anode terminal 11b on the cathode current collector 21b and anode current collector 22b, the positional relation of the cathode terminal 11a and anode terminal 11b is inverted to the case of the first battery element 3. This makes it possible to form the second battery element 3 inverted in the positional relation of the cathode terminal 11a and anode terminal 11b with respect to the case of the first battery element 3. By forming the battery elements 3 in such a configuration, the process of bending the electrode terminals 11 in a crank shape can be omitted to allow the battery elements 3 to be manufactured efficiently.

[Method of Manufacturing Battery Cells]

Figure 7:
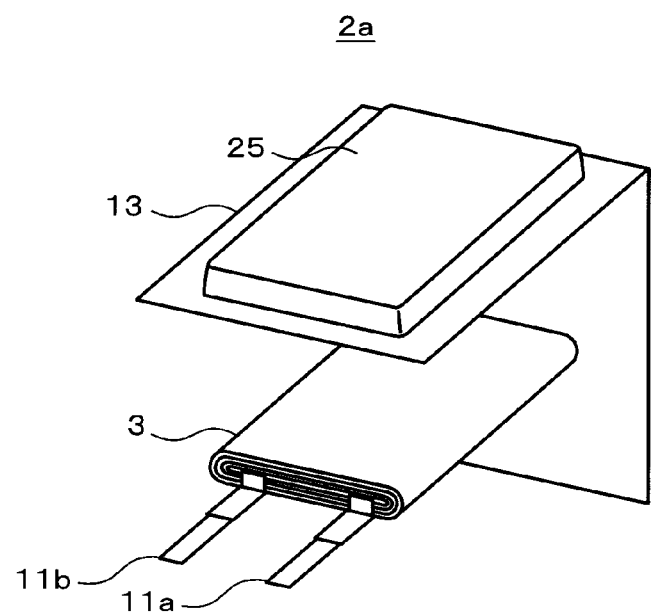
FIG. 7 is a perspective view showing a mode of manufacturing a first battery cell.
Figure 8:
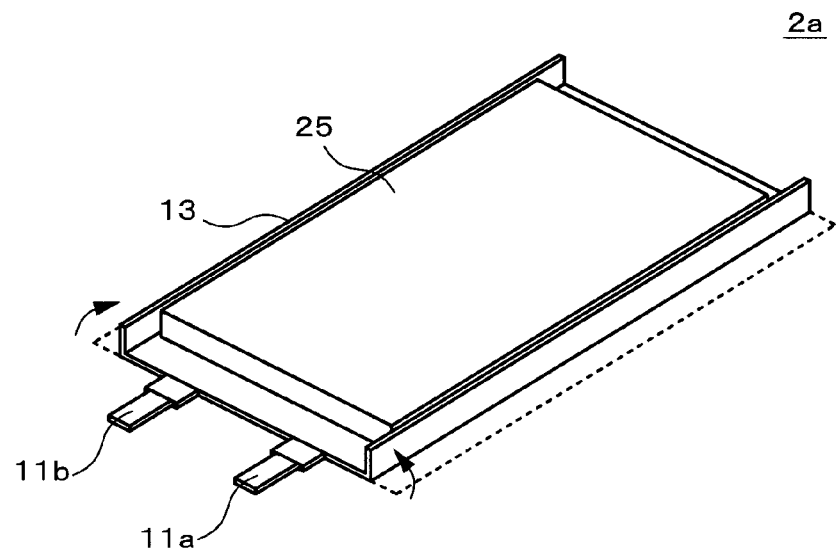
FIG. 8 is a perspective view showing a mode of manufacturing the first battery cell.

Next, explanation will be given to a method of manufacturing first battery cell 2a and second battery cell 2b by using the thus fabricated first battery element 3 and second battery element 3. As shown in FIG. 7, a soft laminate film 13 is deep drawn to form a recess 25, and the fabricated first battery element 3 is housed in the recess 25. As shown in FIG. 8, the soft laminate film 13 is folded back so as to cover the opening of the recess 25 with the soft laminate film 13. Subsequently, three sides around the first battery element 3 except for the folded side are sealed by heat fusion under a reduced pressure to obtain a first battery cell 2a. At this time, the electrode terminal 11 is made to lead out from the bottom side (the side covering the recess 25) of the side face opposite to the folded side.

The second battery cell 2b is similarly manufactured by housing the second battery element 3 in the recess 25 of the soft laminate film 13. The manufacturing method is same as that for the first battery cell 2a except that the second battery element 3 is used as the battery element, and therefore, illustration and explanation are omitted.

In the case of a battery using an electrolytic solution, the electrolytic solution is injected before sealing the soft laminate film 13 by heat fusion. After thermally fusing the two sides except for the folding sides around the battery element, a predetermined amount of the electrolytic solution is poured in from the remaining opening, and finally the opening is heat fused.

[Method of Manufacturing Battery Assembly]

Figure 9:
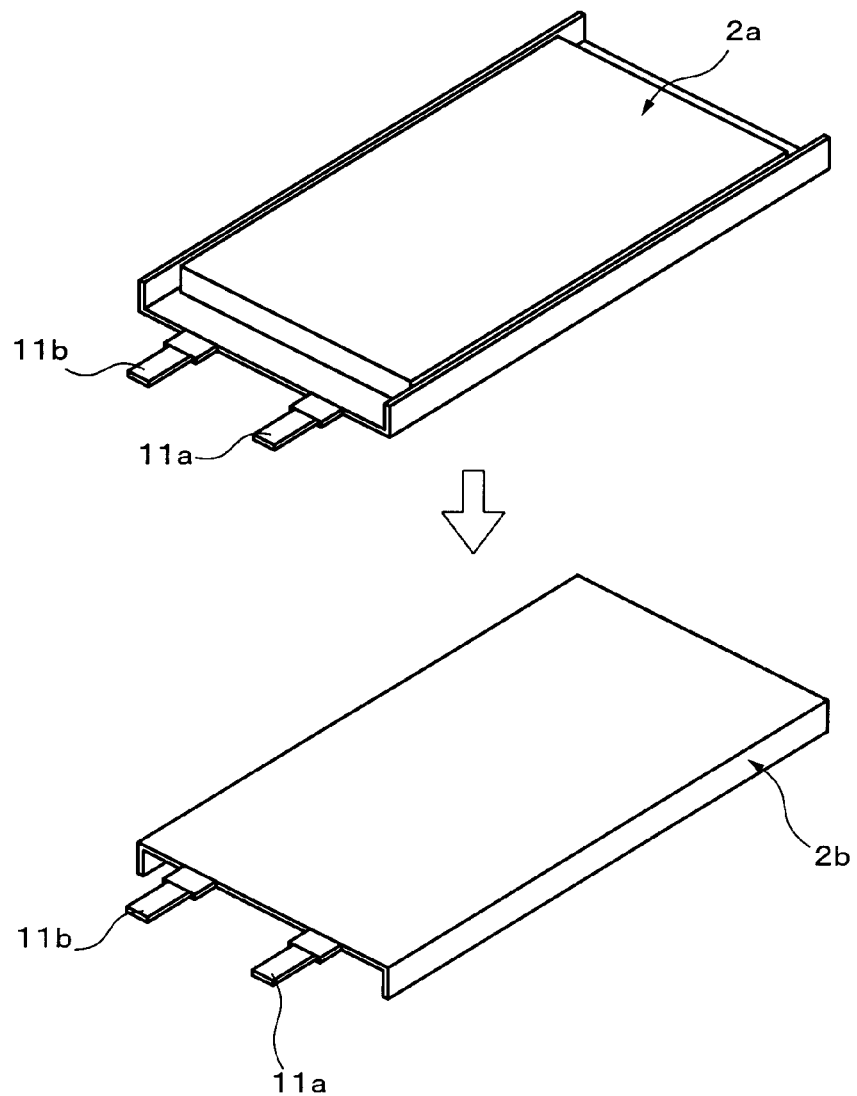
FIG. 9 is a perspective view showing a mode of manufacturing a battery assembly.

A method of manufacturing a battery assembly 1 by using first battery cell 2a and second battery cell 2b will be explained. FIG. 9 shows a mode of overlaying the first battery cell 2a and second battery cell 2b. The first battery cell 2a and second battery cell 2b are overlaid such that the bottoms may mutually contact with each other, and a battery assembly 1 is formed.

Electrode terminals 11 of the first battery cell 2a and second battery cell 2b are made to lead out from the bottom of a predetermined side face. When the first battery cell 2a and second battery cell 2b are overlaid such that the bottoms may mutually contact with each other, the electrode terminals 11 of the first battery cell 2a and second battery cell 2b are adjacent to each other. The adjacent cathode terminals 11a and adjacent anode terminals 11b of the first battery cell 2a and second battery cell 2b are connected by welding or other method. The electrode terminals 11 may be connected also at the same time when connecting with a circuit board 12 mentioned below.

Figure 10:
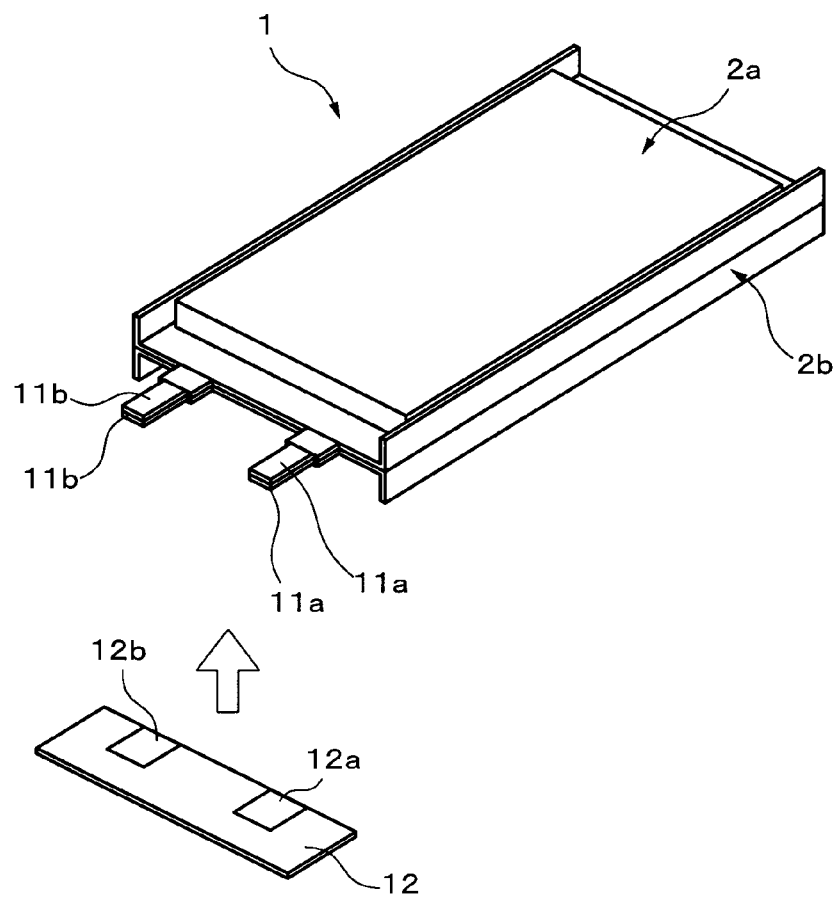
FIG. 10 is a perspective view showing a mode of connecting a battery assembly and a circuit board.
Figure 11:
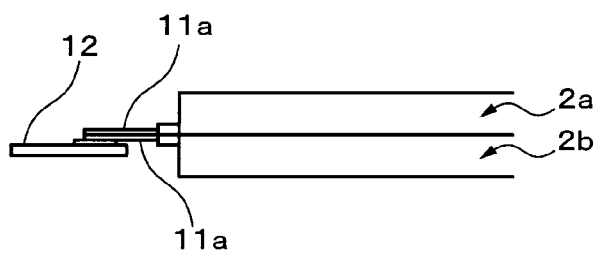
FIG. 11 is a side view of a state in which a battery assembly and a circuit board applicable to an embodiment of the invention are connected with each other.

FIG. 10 shows a mode of connection of a circuit board 12 to the battery assembly 1. The electrode terminals 11 of the battery assembly 1 and contact points provided on the circuit board 12 are connected by welding or soldering, for example. To connect the electrode terminals 11 led out from the battery assembly 1 to the circuit board 12, as shown in FIG. 11, the cathode terminal 11a and anode terminal 11b can be connected straightly to the circuit board 12 without being folded.

A method of connecting the battery assembly 1 with the circuit board 12 is not limited to this example alone. For example, depending on the position at which the circuit board 12 is arranged, the electrode terminals 11 may be folded and connected to the circuit board.

However, when the electrode terminals 11 are folded when connecting the electrode terminals 11 and the circuit board 12, a stress is applied to the folded portion of the electrode terminals 11, and thus, it is preferred to connect the electrode terminals 11 without folding.

The battery assembly 1 manufactured in this manner is accommodated in, for example, a rigid container (not shown) to thereby complete a battery pack.

In an embodiment, as described herein, in either one of the first battery cell 2a and second battery cell 2b constituting the battery assembly 1, the electrode terminals 11 are led out at a same height as a predetermined surface (bottom), and the arrangement of the cathode terminal 11a and anode terminal 11b is inverted between the first battery cell 2a and second battery cell 2b. For this reason, by overlaying the bottom of first battery cell 2a and the bottom of second battery cell 2b face to face, the mutual cathode terminals 11a, 11a, and mutual anode terminals 11b, 11b are adjacent to each other. Hence, the mutual cathode terminals 11a, 11a, and mutual anode terminals 11b, 11b of the first battery cell 2a and second battery cell 2b can be directly connected to each other. Accordingly, the electrode terminals 11 of the first battery cell 2a and second battery cell 2b can be directly connected to the circuit board 12 without using relay tabs or without extending by an extra length.

Consequently, the process of interposing the relay tab between the electrode terminals and the circuit board 12 is not needed, thereby enhancing the manufacturing efficiency. Further, since the space for placing the relay tab is not needed, the battery pack can be reduced in size.

Since the electrode terminals 11 can be directly connected to the circuit board 12 without using relay tabs, it is not necessary to fold the electrode terminals for adjusting the position of the connection end to the circuit board 12 because no relay tab is used, and less stress is applied to the electrode terminals 11. In addition, since no relay tab is interposed, the electrode terminals 11 and the circuit board 12 can be connected more securely. Hence, the quality of the battery pack can be enhanced.

Figure 12:
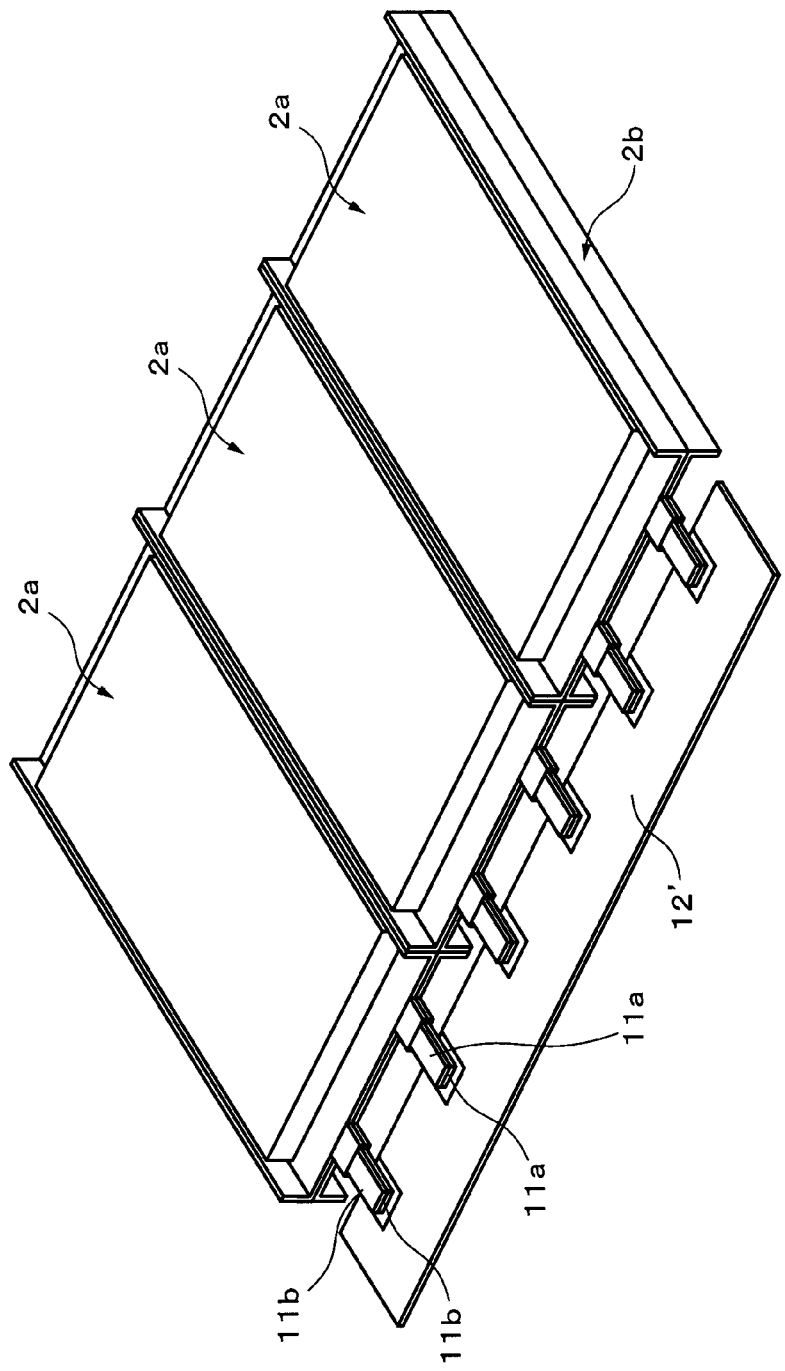
FIG. 12 is a perspective view of a state in which a plurality of battery assemblies and a circuit board applicable to an embodiment of the invention are connected with each other.

In an embodiment, one battery assembly 1 composed of upper and lower battery cells has been explained, but not limited to this example. As shown in FIG. 12, for example, a plurality of battery assemblies 1 may be arranged and connected in parallel or in series, and accommodated in a container (not shown), so that a battery pack of larger capacity and higher output can be manufactured.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery pack comprising:
   at least a first, a second, and a third battery assembly connected in series; and
   a circuit board connected to the battery assemblies,
   wherein each battery assembly consists of discrete first and second battery cells each having (1) a predetermined surface overlaid on each other, and (2) side faces folded perpendicular to the predetermined surface so that each side face of the second battery assembly directly abuts the side faces of the first or third battery assembly,
   the first and second battery cells each have battery elements accommodated in a container thereof, cathode terminals and anode terminals of which are provided at a same height as the predetermined surface at a same side,
   the cathode terminal and anode terminal of the first battery cell are adjacent respectively to the cathode terminal and anode terminal of the second battery cell,
   the cathode terminal of the first battery cell has two opposite cathode faces, one of the cathode faces being directly welded to the cathode terminal of the second battery cell, the other cathode face being exposed, and the anode terminal of the first battery cell has two opposite anode faces, one of the anode faces being directly welded to the anode terminal of the second battery cell, the other anode face being exposed, at least in the first battery cell, the cathode terminal and the anode terminal are partially covered with a resin piece respectively, the circuit board defines two opposing faces, and the cathode terminals and the anode terminals are connected to the circuit board on only one of the faces, the other circuit board face being free of the cathode terminals and the anode terminals, and the cathode terminals and the anode terminals in each battery assembly are connected straightly to the circuit board without being folded.

2. The battery pack according to claim 1, wherein the battery elements of the second battery cell are accommodated in the container such that the cathode terminal and anode terminal thereof are in an inverted position with respect to the cathode terminal and anode terminal of the battery elements of the first battery cell.

3. The battery pack according to claim 1, wherein the first battery cell has a different configuration than the second battery cell.

4. The battery pack according to claim 3, wherein a first positional relation of the cathode terminal and the anode terminal of the first battery cell is inverted with respect to a second positional relation of the cathode terminal and the anode terminal of the second battery cell.

5. The battery pack according to claim 1, wherein the directly connected respective cathode terminals and anode terminals of the first and second battery cells are further directly connected to the circuit board.

6. The battery pack according to claim 1, wherein circuit board is spaced apart from the first and second battery cells when viewed along a direction substantially perpendicular to the predetermined surface.

7. The battery pack according to claim 1, wherein in the second battery cell, the cathode terminal and the anode terminal are partially covered with a resin piece respectively.

8. The battery pack according to claim 1, wherein the circuit board is provided with temperature protective elements, charge and discharge control field effect transistor, an integrated circuit for monitoring a secondary battery and controlling the charge and discharge control field effect transistor, and a connector for making connection with external units.

9. The battery pack according to claim 1, wherein the predetermined surface is composed of a multilayer film having moisture-proof property and insulation property.

10. The battery pack according to claim 9, wherein the multilayer film has a metal foil enclosed between a container layer and a sealant layer.

* * * * *